(12) United States Patent
Montojo et al.

(10) Patent No.: US 6,693,920 B2
(45) Date of Patent: Feb. 17, 2004

(54) METHOD AND AN APPARATUS FOR A WAVEFORM QUALITY MEASUREMENT

(75) Inventors: Juan Montojo, San Diego, CA (US); Nagabhushana Sindhushayana, San Diego, CA (US); Peter Black, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 548 days.

(21) Appl. No.: 09/738,586

(22) Filed: Dec. 14, 2000

(65) Prior Publication Data

US 2002/0114353 A1 Aug. 22, 2002

(51) Int. Cl.[7] .................................. H04J 3/06
(52) U.S. Cl. ...................... 370/503; 370/508
(58) Field of Search ................. 370/503, 352, 370/320, 209, 508; 375/208, 224–228, 281, 130, 329–332, 371, 340; 702/66

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,504,773 A | | 4/1996 | Padovani et al. |
| 5,799,038 A | * | 8/1998 | Nowara et al. ............. 375/224 |
| 5,802,105 A | | 9/1998 | Tiedemann, Jr. et al. ... 375/225 |
| 6,104,983 A | * | 8/2000 | Nakada ....................... 370/320 |
| 6,137,773 A | * | 10/2000 | Stilwell et al. ............ 370/209 |
| 6,470,056 B1 | * | 10/2002 | Kurihara et al. ........... 375/281 |

FOREIGN PATENT DOCUMENTS

WO  9965182  12/1999

OTHER PUBLICATIONS

U.S. Application No. 08/963,386 filed Nov. 3, 1997, entitled "Method and Apparatus for High Rate Packett Data Transmission," Paul E. Bender, et al., QUALCOMM Incorporated, San Diego, CA 92121 (USA).

* cited by examiner

*Primary Examiner*—Chi Pham
*Assistant Examiner*—Prenell Jones
(74) *Attorney, Agent, or Firm*—Philip Wadsworth; Kent Baker; Pavel Kalousek (57) ABSTRACT

A method and an apparatus for waveform quality measurement are disclosed. An actual signal, representing a waveform channelized both in time and in code is generated by, e.g., an exemplary HDR communication system. Test equipment generates an ideal waveform corresponding to the actual waveform. The test equipment then generates an estimate of offsets between parameters of the actual waveform and the ideal waveform, and the offsets are used to compensate the actual waveform. The test equipment then evaluates various waveform quality measurements utilizing the compensated actual waveform and the corresponding ideal waveform. Definitions of the various waveform quality measurements as well as conceptual and practical examples of processing of the actual waveform and the corresponding ideal waveform by the test equipment are disclosed. The disclosed method and apparatus may be extended to any waveform channelized both in time and in code regardless of the equipment that generated the waveform.

55 Claims, 2 Drawing Sheets

METHOD AND AN APPARATUS FOR A WAVEFORM QUALITY MEASUREMENT

BACKGROUND OF THE INVENTION

I. Field of the Invention

The current invention relates to quality assurance. More particularly, the present invention relates to method and apparatus for waveform quality measurement.

II. Description of the Related Art

Recently, communication systems have been developed to allow transmission of signals from an origination station to a physically distinct destination station. In transmitting signal from the origination station over a communication link, the signal is first converted into a form suitable for efficient transmission over the communication link. As used herein, the communication link comprises a media, over which a signal is transmitted. Conversion, or modulation, of the signal involves varying a parameter of a carrier wave in accordance with the signal in such a way that the spectrum of the resulting modulated carrier is confined within the communication link bandwidth. At the destination station the original signal is replicated from a version of the modulated carrier received over the communication link. Such a replication is generally achieved by using an inverse of the modulation process employed by the origination station.

Modulation also facilitates multiple-access, i.e., simultaneous transmission and/or reception, of several signals over a common communication link. Multiple-access communication systems often include a plurality of remote subscriber units requiring intermittent service of relatively short duration rather than continuous access to the common communication link. Several multiple-access techniques are known in the art, such as time division multiple-access (TDMA), frequency division multiple-access (FDMA), and amplitude modulation (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

Figure 1:
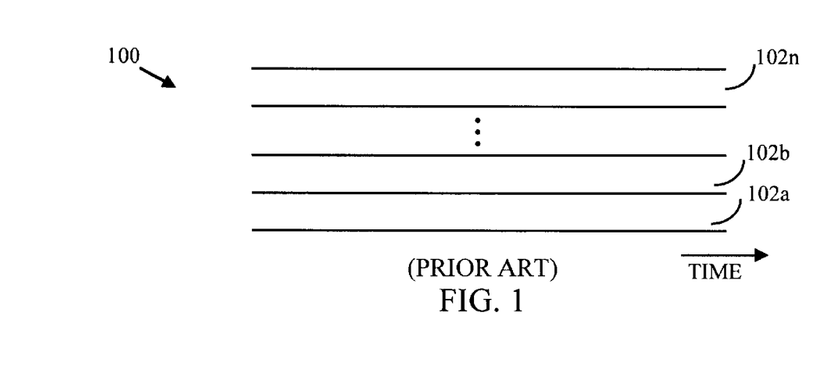
FIG. 1 illustrates an idealized waveform of a code division communication system.

FIG. 1 illustrates an ideal waveform 100 of an embodiment of a code division communication system in accordance with the IS-95 standard. For the purposes of this document, a waveform is a manifestation, representation or visualization of a wave, pulse or transition. The idealized waveform 100 comprises parallel channels 102 distinguished from one another by a cover code. The cover code in a communication system according to the IS-95 standard comprises Walsh codes. The ideal waveform 100 is then quadrature spreaded, baseband filtered and upconverted on a carrier frequency. The resulting modulated waveform 100, is expressed as:

$$s(t) = \sum_i R_i(t) e^{-j\omega_c t} \qquad (1)$$

where:

$\omega_c$ is the nominal carrier frequency of the waveform;

i is the index of the code channels summation; and $R_i(t)$ is the complex envelope of the ideal i-th code channel. Equipment, e.g., a transmitter of the code division communication system, generates actual waveform x(t) that is different from the ideal waveform. Such an actual waveform x(t) is expressed as:

$$x(t) = \sum_i b_i [R_i(t + \tau_i) + E_i(t)] \cdot e^{-j[(\omega_c + \Delta\omega)(t+\tau_i) + \theta_i]} \qquad (2)$$

where:

$b_i$ is the amplitude of the ideal waveform relative to the ideal waveform for the $i_{th}$ code channel;

$\tau_i$ is the time offset of the ideal waveform relative to the ideal waveform for the $i_{th}$ code channel;

$\Delta\omega$ is the radian frequency offset of the signal;

$\theta_i$ is the phase offset of the ideal waveform relative to the ideal waveform for the $i_{th}$ code channel; and $E_i(t)$ is the complex envelope of the error (deviation from ideal) of the actual transmit signal for the i-th code channel.

The difference between the ideal waveform s(t) and the actual waveform x(t) is measured in terms of frequency tolerance, pilot time tolerance, and waveform compatibility. One method to perform such a measurement, is to determine modulation accuracy defined as a fraction of power of the actual waveform x(t) that correlates with the ideal waveform s(t), when the transmitter is modulated by the code channels. The modulation accuracy is expressed as:

$$\rho_{overall} = \frac{\int_{T_1}^{T_2} |s(t) \cdot x(t)^*| \cdot dt}{\{\int_{T_1}^{T_2} |s(t)|^2 \cdot dt\} \cdot \{\int_{T_1}^{T_2} |x(t)|^2 \cdot dt\}} \qquad (3)$$

where:

$T_1$ is beginning of the integration period; and $T_2$ is the end of the integration period.

For discrete time systems, where s(t) and x(t) are sampled at ideal sampling points $t_k$, Equation 3 can be written as:

$$\rho_{overall} = \frac{\sum_{k=1}^{N} |S_k \cdot X_k^*|^2}{\left\{\sum_{k=1}^{N} |S_k|^2\right\} \cdot \left\{\sum_{k=1}^{N} |X_k|^2\right\}} \qquad (4)$$

where:

$X_k = x[k] = x(t_k)$ is $k_{th}$ sample of the actual waveform; and $S_k = s[k] = s(t_k)$ is the corresponding $k_{th}$ sample of the ideal waveform.

A multiple-access communication system may carry voice and/or data. An example of a communication system carrying both voice and data is a system in accordance with the IS-95 standard, which specifies transmitting voice and data over the communication link. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard). Such communication systems use a waveform similar to the one discussed above.

Recently, a data only communication system for a high data rate (HDR) transmission has been developed. Such a communication system has been disclosed in co-pending application Ser. No. 08/963,386, entitled "METHOD AND APPARATUS FOR HIGH RATE PACKET DATA TRANSMISSION," filed Nov. 3, 1997, assigned to the assignee of the present invention and incorporated by reference herein. The HDR communication system defines a set of data rates, ranging from 38.4 kbps to 2.4 Mbps, at which an origination terminal (access point, AP) may send data packets to a receiving terminal (access terminal, AT). The HDR system utilizes a waveform with channels distinguished both in time domain and code domain.

Figure 2:
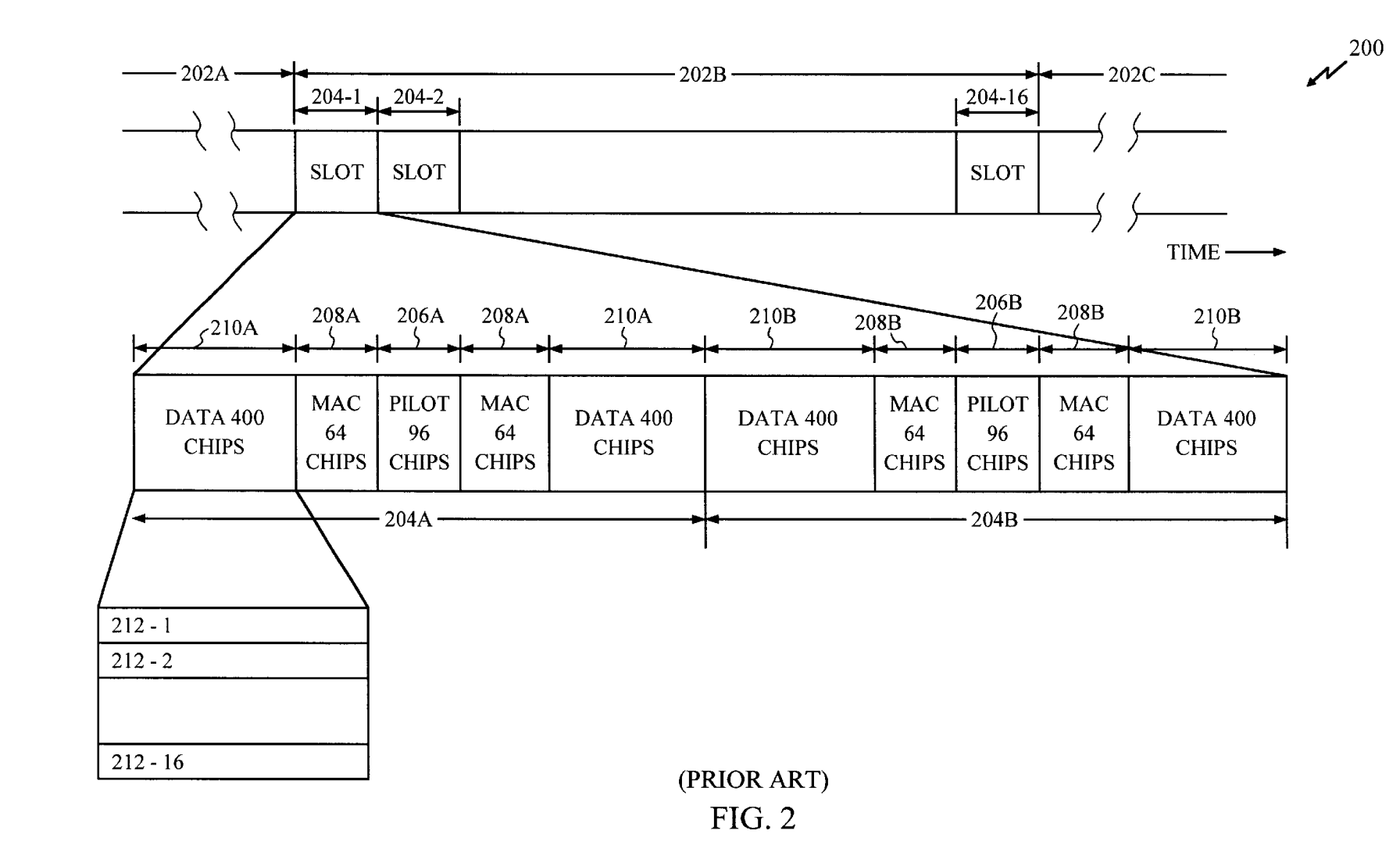
FIG. 2 illustrates an idealized waveform of an HDR communication system.

FIG. 2 illustrates such a waveform 200, modeled after a forward link waveform of the above-mentioned HDR system. The waveform 200 is defined in terms of frames 202. (Only frames 202a, 202b, 202c are shown in FIG. 2.) In an exemplary embodiment, a frame comprises 16 time slots 204, each time slot 204 being 2048 chips long, corresponding to a 1.67 millisecond slot duration, and, consequently, a 26.67 ms frame duration. Each slot 204 is divided into two half-slots 204a, 204b, with pilot bursts 206a, 206b transmitted with in each half-slot 204a, 204b. In an exemplary embodiment, each pilot burst 206a, 206b is 96 chips long, and is centered at the mid-point of its associated half-slot 204a, 204b. The pilot bursts 206a, 206b comprise a pilot channel signal covered by a Walsh cover with index 0. The pilot channel is used for synchronization purposes. A forward medium access control channel (MAC) 208 forms two bursts 208a and two bursts 208b of length 64 chips each. The MAC bursts 208a, 208b are transmitted immediately before and immediately after the pilot bursts 206a, 206b of each slot 204. In an exemplary embodiment, the MAC is composed of up to 63 code channels, which are orthogonally covered by 64-ary Walsh codes. Each code channel is identified by a MAC index, which has a value between 0 and 63, and identifies the unique 64-ary Walsh cover. The MAC indexes 0 and 1 are reserved. A reverse power control channel (RPC) is used to regulate the power of the reverse link signals for each subscriber station. The RPC is assigned to one of the available MACs with MAC index 5-63. The MAC with MAC index 4 is used for a reverse activity channel (RA), which performs flow control on a reverse traffic channel. The forward link traffic channel and control channel payload is sent in the remaining portions 210a of the first half-slot 204a and the remaining portions 210b of the second half-slot 204b. The forward traffic channel and control channel data are encoded, scrambled, and interleaved. The interleaved data are modulated, repeated, and punctured, as necessary. Then, the resulting sequences of modulation symbols are demultiplexed to form 16 pairs (in-phase and quadrature) of parallel streams. Each of the parallel streams is covered with a distinct 16-ary Walsh cover, yielding a code-distinguished channel 212.

The ideal waveform 200 is then quadrature spreaded, baseband filtered and upconverted on a carrier frequency. The resulting modulated waveform 200, is expressed as:

$$s(t) = \sum_{i(t)} R_i(t) e^{-j\omega_c t} \tag{5}$$

where:

$\omega_c$ is the nominal carrier frequency of the waveform;

i(t) is the index of the code channels. The index is time dependent as the number of code channels varies with time; and $R_i$ (t) is the complex envelope of the ideal i-th code channel, given as:

$$R_i(t) = a_i \left[ \sum_k g(t - kT_c) \cos(\phi_{i,k}) + j \sum_k g(t - kT_c) \sin(\phi_{i,k}) \right] \tag{6}$$

where:

$a_i$ is the amplitude of the ith code channel;

g(t) is the unit impulse response of the baseband transmit filter;

$\phi_{i, k}$ is the phase of the kth chip for the ith code channel, occurring at discrete time $t_k$=kTc.

Tc is a chip duration.

The transmitter of the HDR communication system generates an actual waveform x(t), given as:

$$x(t) = \sum_{i(t)} b_i [R_i(t + \tau_i) + E_i(t)] \cdot e^{-j[(\omega_c + \Delta\omega)(t + \tau_i) + \theta_i]} \tag{7}$$

where $b_i$ is the amplitude of the ideal waveform relative to the ideal waveform for the $i_{th}$ code channel;

$\tau_i$ is the time offset of the ideal waveform relative to the ideal waveform for the $i_{th}$ code channel;

$\Delta\omega$ is the radian frequency offset of the signal;

$\theta_i$ is the phase offset of the ideal waveform relative to the ideal waveform for the $i_{th}$ code channel; and $E_i(t)$ is the complex envelope of the error (deviation from ideal) of the actual transmit signal for the i-th code channel.

Based on the complex time domain and code domain channelization of the waveform 200, the waveform quality measurement methods based on code domain channelization are inapplicable. Consequently, there is a need in the art for a method and an apparatus for waveform quality measurement for waveforms channelized both in time domain and code domain.

SUMMARY OF THE INVENTION

The present invention is directed to a novel method and apparatus for waveform quality measurement. According to the method, an actual signal, representing a waveform divided into channels both in time domain and in code domain is generated. Such an actual waveform can be generated, for example, by a communication system. Test equipment generates an ideal waveform corresponding to the actual waveform. The test equipment then generates an estimate of offsets between parameters of the actual waveform and the ideal waveform, and uses the offsets to compensate the actual waveform. In one embodiment, overall modulation accuracy is evaluated in accordance with the compensated ideal waveform and the ideal waveform.

In another embodiment, modulation accuracy for a particular time division channel of the waveform is evaluated. The compensated actual waveform is processed to provide the particular time division channel. In one implementation, the processing comprises assigning the compensated actual signal a value that is non-zero in intervals where the particular time division channel is defined and non-zero elsewhere. In another implementation, the processing comprises a multiplication of the compensated actual waveform by a function with a value that is non-zero in intervals where the particular time division channel is defined and zero elsewhere. In one implementation, the ideal waveform is processed in the same manner. In another implementation, the ideal waveform, containing the particular time division channel is generated directly. The modulation accuracy for the particular time division channel is evaluated in accordance with the processed compensated actual waveform and the processed ideal waveform.

In yet another embodiment, code domain power coefficients for a particular code channel are evaluated. The particular time division channel, which contains the particular code channel, of the compensated actual waveform is obtained according to the above-described methods. In one implementation, the ideal waveform is processed in the same manner. In another implementation, the ideal waveform containing the particular code channel of the particular time division channel is generated directly. The modulation accuracy for the particular time division channel is evaluated in accordance with the processed compensated actual waveform and the processed ideal waveform.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 3:
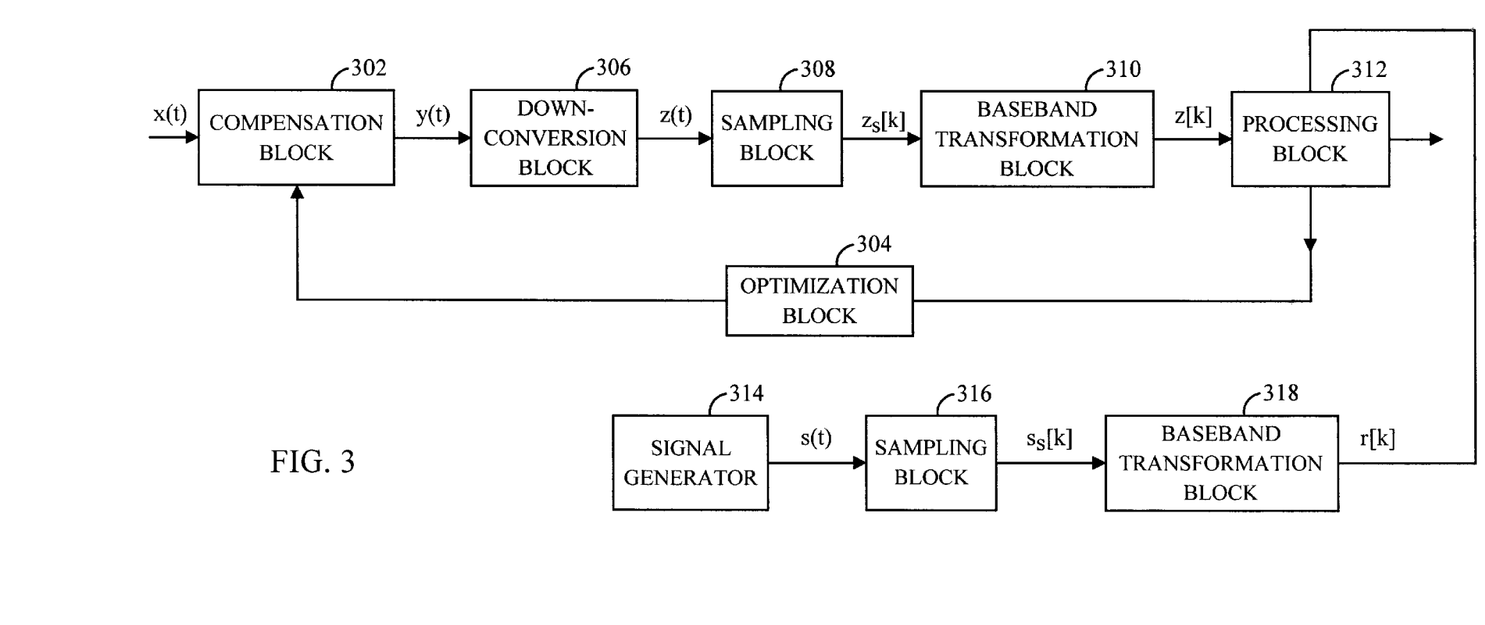
FIG. 3 illustrates a concept of an apparatus capable of implementing waveform quality measurement in accordance with the principles of this invention.

FIG. 3 illustrates a concept of an apparatus capable of implementing waveform quality measurement for waveforms channelized both in time domain and in code domain, such as the exemplary waveform 200 from FIG. 2.

In one embodiment, actual signal x(t) (representing waveform 200 from FIG. 2) enters compensation block 302. The compensation block 302 is also provided with estimates of offsets of the actual waveform x(t) with respect to an ideal waveform s(t) from an optimization block 304. The compensation block 302 uses the offset estimates to provide a compensated waveform y(t). The compensated waveform y(t) is provided to a down-conversion block 306. The down-converted signal is then provided to an optional sampling block 308. The sampled waveform $z_s[k]$ is provided to an optional baseband transformation block 310. The output waveform z[k] from the optional baseband transformation block 310 is provided to a processing block 312.

In one embodiment, the ideal waveform s(t) is generated by a signal generator 314. The ideal waveform s(t) is provided to an optional sampling block 316. The sampled waveform $s_s[k]$ is provided to an optional baseband transformation block 318. The output waveform r[k] from the optional baseband transformation block 318 is provided to a processing block 312. In another embodiment, the signal generator 314 generates the digital waveform r[k] directly. Therefore, in such an embodiment, the sampling block 316 and the optional baseband transformation block 318 are not needed.

The processing block 312 uses signals z[k] and r[k] to calculate waveform characteristics.

As discussed, the actual waveform x(t) will be offset from the ideal waveform s(t) in frequency, time and phase. The waveform quality measurement is determined for the best alignment between the actual waveform x(t) will be offset from the ideal waveform s(t). Consequently, the waveform quality measurement is evaluated for a plurality of combinations of frequency, time, and phase offsets, and the maximum of such evaluations is taken as a figure of merit. The function of optimization block 304 is to generate the plurality of combinations of frequency, time, and phase offsets.

The function of the compensation block 302 is to operate on the waveform x(t) to provide compensated waaveform y(t), given by Equation 7:

$$y(t)=x(t-\hat{\tau}_0)e^{j[\Delta\hat{\omega}\cdot t+\hat{\theta}_0]} \qquad (8)$$

where:

$\Delta\hat{\omega}$—an estimate of radian frequency offset of the signal x(t) with respect to signal s(t);

$\hat{\tau}_0$—an estimate of time offset of the signal x(t) with respect to signal s(t);

$\hat{\theta}_0$—an estimate of phase offset of the signal x(t) with respect to signal s(t).

The $\Delta\hat{\omega}$, $\hat{\tau}_0$, $\hat{\theta}_0$ are provided to the compensation block 302 by the optimization block 304.

As discussed, the waveform x(t) was up-converted on a carrier frequency, the purpose of the down-conversion block 306 is to down-convert the compensated waveform y(t) to a baseband waveform z(t).

In one embodiment, the optional sampler block 308 creates discrete version z[k] of the waveform z(t) by sampling the waveform z(t) at the ideal sampling points $t_k$:

$$z[k]=z(t_k); \forall k \qquad (9)$$

In another embodiment, the optional sampler block 308 is omitted and the sampling is performed by the processing block 312 after baseband transformation.

As discussed, the waveform 200 is baseband filtered before transmission. Consequently, the optional baseband transformation block 310 is utilized to remove inter-symbol interference (ISI) introduced by the transmitter filter. To accomplish this, the transfer function of the baseband transformation block 310 is an inverse complex conjugate of the transfer function of the ideal transmitter filter.

The processing block 312 operates on the signals z[k] and r[k] to provide the required waveform quality measurement as described in detail below. In one embodiment, when the optional sampler block 308 has been omitted, the processing block 312 creates discrete z[k] version of the signal z(t) by sampling the signal z(t) at the ideal sampling points $t_k$ in accordance with Equation 9.

Considering the above-described apparatus, one of ordinary skills in the art will be able to modify the block schematics to different representation of the waveforms x(t) and s(t). For example, if the waveform x(t) is represented as a baseband signal in a digital domain, a down-conversion block 306 and an optional sampling block 308 need not be present. Furthermore, if the waveform x(t) has not been filtered an optional baseband transformation block 310 need not be present. Furthermore, one of ordinary skills in the art will be able to modify the block schematics according to a type of measurement to be performed. For example, if an effect of a baseband filter is to be ascertained, the baseband transformation blocks 310 and 318 would be omitted, thus, the processing block 312 would be provided with the ideal waveform and the ideal waveform from sampling blocks 308 and 316.

Modulation Accuracy Measurement

Modulation accuracy is defined as a fraction of power in the actual waveform z[k] that correlates with the ideal waveform r[k], when the transmitter is modulated by at least one channel in the waveform.

An overall modulation accuracy is defined as a fraction of power in the actual waveform z[k] that correlates with the ideal waveform r[k] when the transmitter is modulated by all the channels in the waveform. In the exemplary embodiment of the HDR communication system, these channels comprise the Pilot Channel, the MAC Channel and the Forward Traffic or Control Channel. The first overall modulation accuracy is defined as follows:

$$\rho_{overall-1} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}} \quad (10)$$

where:

$\rho_{overall-1}$ is the first overall modulation accuracy;

j is an index designating an elementary unit of a waveform;

N is a summation limit designating number of elementary units;

k is an index designating a sample in the elementary unit;

M is a summation limit designating number of samples in the elementary unit;

$Z_{j,k}=z[M(j-1)+k]$ is a $k_{th}$ sample in the $j_{th}$ elementary unit of the actual waveform; and $R_{j,k}=r[M(j-1)+k]$ is a $k_{th}$ sample in the $j_{th}$ elementary unit of the ideal waveform.

Elementary unit is defined as a minimum waveform span defining a complete channel structure. The value of the summation limit N is chosen so that a noise variance of the measurement is below a required value.

Applying Equation 10 to the waveform 200 of a forward link of the HDR system, the elementary unit is a half-slot, consequently, the summation limit M=1024. The first sample, $z(t_1)$, occurs at the first chip of a half slot and the final sample, $Z(t_{1024N})$, occurs at the last chip of a half slot. The value of the summation limit N has been determined to be at least 2.

The first overall modulation accuracy fails to account for possible discontinuities of parameters of the waveform on the borders of the elementary units. Consequently, a second overall modulation accuracy is defined as follows:

$$\rho_{overall-2} = \frac{N \cdot \sum_{j=1}^{N} \left| \sum_{k=\frac{M}{2}+1}^{M+\frac{M}{2}+1} Z_{j,k} R_{j,k}^* \right|^2}{\left\{ \sum_{j=1}^{N} \sum_{k=\frac{M}{2}+1}^{M+\frac{M}{2}+1} |R_{j,k}|^2 \right\} \cdot \left\{ \sum_{j=1}^{N} \sum_{k=\frac{M}{2}+1}^{M+\frac{M}{2}+1} |Z_{j,k}|^2 \right\}} \quad (11)$$

where:

$\rho_{overall-2}$ is the second overall modulation accuracy;

j is an index designating an elementary unit of a waveform;

N is a summation limit designating number of elementary units;

k is an index designating a sample in the elementary unit;

M is a summation limit designating number of samples in the elementary unit;

$$Z_{j,k} = z\left[\left(M + \frac{M}{2} + 1\right) \cdot (j-1) + k\right]$$

is a $k_{th}$ sample in the $j_{th}$ elementary unit of the actual waveform; and $$R_{j,k} = r\left[\left(M + \frac{M}{2} + 1\right) \cdot (j-1) + k\right]$$

is a $k_{th}$ sample in the $j_{th}$ elementary unit of the ideal waveform.

Applying Equation 11 to the waveform 200 of a forward link of the HDR system, the elementary unit is a half-slot, consequently, the summation limit M=1024. The first sample, $z(t_{531})$, occurs at the $513_{th}$ chip of a half slot and the final sample, $Z(t_{1536N})$, occurs at the $513_{th}$ chip of the last half slot. The value of the summation limit N has been determined to be at least 2.

A time division channel (TD_channel) modulation accuracy is defined as a fraction of power in the actual waveform z[k] that correlates with the ideal waveform r[k] when the transmitter is modulated by the particular TD_channel in the waveform. In the exemplary embodiment of the HDR communication system, the channels comprise the Pilot Channel, the MAC Channel and the Forward Traffic or Control Channel. The TD_channel modulation accuracy is defined as follows:

$$\rho_{TD\_channel} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}} \quad (12)$$

where:

$\rho_{TD\_channel}$ is the modulation accuracy for the time division channel identified by an index TD_channel;

j is an index designating an elementary unit of a waveform;

N is a summation limit designating number of elementary units;

k is an index designating a sample in the elementary unit;

M is a summation limit designating number of samples in the elementary unit;

$Z_{j,k}=z[M(j-1)+k]$ is a $k_{th}$ sample in the $j_{th}$ elementary unit of the actual TD_channel; and $R_{j,k}=r[M(j-1)+k]$ is a $k_{th}$ sample in the $j_{th}$ elementary unit of the ideal TD_channel.

The concept of processing the actual waveform z[k] and the idela waveform r[k] to obtain a particular TD_channel is described next. A function $g_{TD\_channel}$ is defined:

$$g_{TD\_channel}[k] = \begin{cases} 1 & \text{if} \begin{cases} m_1 \leq (k \bmod L) \leq m_2 \\ m_3 \leq (k \bmod L) \leq m_4 \\ \vdots \\ m_{n-1} \leq (k \bmod L) \leq m_n \end{cases} \\ 0 & \text{elsewhere} \end{cases} \quad (13)$$

where:

$m_p \leq (k \bmod L \leq m_{p+1})$ for p=1,2, . . . n, defines intervals where the waveform is nonzero for the particular TD_channel; and L interval of an elementary unit of the signal z[k].

Then, the actual waveform z[k] and the ideal waveform r[k] are multiplied by the function $g_{TD\_channel}[k]$, to yield the particular TD_channels:

$z'[k]=z[k]\cdot g_{TD\_channel}[k]$ $r'[k]=r[k]\cdot g_{TD\_channel}[k]$ (14)

One of ordinary skills in the art will understand that the implementation of the concept can vary. In one embodiment, the processing is implemented as a multiplication of the waveform by a function with a value that is non-zero in intervals where the particular time division channel is defined and zero elsewhere. In another embodiment, the processing comprises assigning the waveform a value that is non-zero in intervals to where the particular time division channel and zero elsewhere. In yet another embodiment, the processing unit, implementing Equation (12) is configured to carry the internal summations as follows:

$$\sum_{k=1}^{M} = \sum_{m_1}^{m_2} + \sum_{m_3}^{m_4} + \cdots + \sum_{m_{n-1}}^{m_n} \quad (15)$$

where:

$m_p \leq (k \bmod L \leq m_{p+1})$ for p=1,2, . . . n, defines interval where the waveform is nonzero for the particular TD_channel; and L interval of an elementary unit of the signals z[k] and r[k].

Code Domain Measurement

Code domain power is defined as a fraction of power of the signal $Z(t_k)$ that correlates with each code channel $R_i(t_k)$ when the transmitter is modulated according to a known code symbol sequence. The concept of processing the waveform to obtain each code channel $R_i(t_k)$ is described next. First, a particular TD_channel containing each code channel $R_i(t_k)$ is obtained, utilizing any of the above-outlined methods. For example, Equation 13 is used to obtain function $g_{TD\_channel}[k]$ for the particular TD_channel. The function $g_{TD\_channel}[k]$ is then used to operate on the actual waveform z[k] and the i-th code channel $R_i[k]$ of the ideal signal r[k] to obtain waveforms:

$z'[k]=z[k]\cdot g_{TD\_channel}[k]$ $R'_i[k]=R_i[k]\cdot g_{TD\_channel}[k]$ (16)

The waveform quality code domain power coefficients $\rho_{TD\_channel,\,i}$ for the particular TD_channel are then defined for each code channel $R_i(t_k)$ as follows:

$$\rho_{\text{TDM\_channel},i} = \frac{N \cdot \sum_{j=1}^{N}\left|\sum_{k=1}^{M} Z_{j,k} R'^*_{i,j,k}\right|^2}{\left\{\sum_{j=1}^{N}\sum_{k=1}^{M} |R'_{i,j,k}|^2\right\} \cdot \left\{\sum_{j=1}^{N}\sum_{k=1}^{M} |Z_{j,k}|^2\right\}}, \quad (17)$$

$i = w_1, \ldots, w_v$ where:

$\rho_{TDM\_channel,\,i}$ is the code domain coefficient for a time division channel identified by an index TD_channel and a code channel $R_i[k]$ identified by index i;

$w_1$ is a first code channel for the time division channel TDM_channel;

$w_V$ is a last code channel for time division channel TDM_channel;

j is an index designating an elementary unit of waveforms;

N is a summation limit designating number of elementary units;

k is an index designating a sample in the elementary unit;

M is a summation limit designating number of samples in the elementary units;

$Z'_{j,k}=Z'[M(j-1)+k]$ is a kth sample in the jth elementary unit of the filtered signal; and $R'_{i,j,k}=R'_i[M(j-1)+k]$ is a kth sample in the jth elementary unit of the i-th code channel of the ideal signal.

For example, applying the above-described method to evaluate $\rho_{MAC,i}$, of the waveform 200 of a forward link of the HDR system, the elementary unit is a half-slot, consequently, the summation limit M=1024. From Equation (13) and FIG. 2:

$$g_{MAC}[k] = \begin{cases} 1 & \text{if} \begin{cases} 401 \leq (k \bmod 1024) \leq 464 \\ 561 \leq (k \bmod 1024) \leq 624 \end{cases} \\ 0 & \text{elsewhere} \end{cases} \quad (18)$$

where (k mod 1024)=1 occurs at the first chip of every half slot. Then, Equation (16) yields:

$z'[k]=z[k]\cdot g_{MAC}[k]$ $R'_i[k]=R_i[k]\cdot g_{MAC}[k]$ (19)

The following code domain power coefficients $\rho_{MAC,\,i}$ are defined for the MAC Channel by Equation (17):

$$\rho_{MAC,i} = \frac{N \cdot \sum_{j=1}^{N}\left|\sum_{k=1}^{1024} Z''_{j,k} R''^*_{i,j,k}\right|^2}{\left\{\sum_{j=1}^{N}\sum_{k=1}^{1024} |R''_{i,j,k}|^2\right\} \cdot \left\{\sum_{j=1}^{N}\sum_{k=1}^{1024} |Z''_{j,k}|^2\right\}}, \quad (20)$$

$i = 2, \ldots, 63$

The value of N for the measurement of $\rho_{MAC,i}$ for i≠4, has been determined to be at least 16. The first sample, $z(t_1)$, occurs at the first chip of a half slot and the final sample, $z(t_{1024N})$, occurs at the last chip of a half slot.

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, signals, bits, symbols, and chips that may be referenced throughout the above description are advantageously represented by voltages, currents, electromagnetic waves, magnetic fields or particles, optical fields or particles, or any combination thereof.

The previous description of the preferred embodiments, using communication systems to exemplify measurement of waveform quality, is provided to enable any person skilled in the art to make or use the present invention. The various modifications to these embodiments will be readily apparent to those skilled in the art, and the generic principles defined herein may be applied to other embodiments with out the use of the inventive faculty. Specifically, one of ordinary skills in the art will understand that the generic principles disclosed apply equally to any like waveform regardless of the equipment that generated the waveform. Thus, the present invention is not intended to be limited to the embodiments shown herein but is to be accorded the widest scope consistent with the principles and novel features disclosed herein.

What is claimed is:

1. A method for determining a waveform quality measurement, comprising:
   providing a plurality of offsets of parameters of an actual signal with respect to an ideal signal;
   compensating the actual signal with the plurality of offsets to generate a compensated actual signal;
   filtering the compensated actual signal to generate a filtered signal;
   modifying the ideal signal to correspond to the filtered signal to generate a modified signal; and
   determining the waveform quality measurement in accordance with the modified ideal signal and the filtered signal.

2. The method of claim 1 wherein the providing a plurality of offsets comprises providing a frequency offset, a time offset, and a phase offset.

3. The method of claim 1 wherein the compensating the actual signal with the plurality of offsets comprises compensating in accordance with the following equation:

$$y(t)=x(t-\hat{\tau}_0)e^{j[\Delta\hat{\omega}t+\hat{\theta}_0]}$$

where:
   $y(t)$ is the compensated actual signal;
   $x(t)$ is the actual signal;
   $t$ is time;
   $j$ is an imaginary unit;
   $\Delta\hat{\omega}$ is the frequency offset;
   $\hat{\tau}_0$ is the time offset; and
   $\hat{\theta}_0$ is the phase offset.

4. The method of claim 1 wherein the filtering comprises assigning the compensated actual signal a value that is zero in intervals to be filtered and non-zero elsewhere.

5. The method of claim 4 wherein the filtering comprises assigning the compensated actual signal a value that is non-zero over an elementary unit of the actual signal.

6. The method of claim 4 wherein the assigning the compensated actual signal a value comprises:
   defining a function with a value that is zero in intervals to be filtered and non-zero elsewhere; and
   multiplying the compensated actual signal by the function.

7. The method of claim 6 wherein the defining a function comprises defining a function with a value that is non-zero over a elementary unit of the actual signal.

8. The method of claim 1 wherein the modifying the ideal signal comprises generating the modified ideal signal to have a value that is zero in intervals where the filtered signal has a value of zero and non-zero elsewhere.

9. The method of claim 1 wherein the modifying the ideal signal comprises assigning the ideal signal a value that is zero in intervals where the filtered signal has a value of zero and non-zero elsewhere.

10. The method of claim 9 wherein the assigning the ideal signal a value a value comprises:
    defining a function with a value that is zero in intervals where the filtered signal has a value of zero and non-zero elsewhere; and
    multiplying the compensated actual signal by the function.

11. The method of claim 5 wherein the determining the waveform quality comprises calculating a first overall modulation accuracy.

12. The method of claim 11 wherein the calculating a first modulation accuracy comprises calculating in accordance with the following equation:

$$\rho_{overall-1} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}}$$

where:
   $\rho_{overall-1}$ is the first overall modulation accuracy;
   $j$ is an index designating an elementary unit of signals;
   $N$ is a summation limit designating a number of elementary units;
   $k$ is an index designating a sample in the elementary unit;
   $M$ is a summation limit designating a number of samples in the elementary unit;

$Z_{j,k}=z[M(j-1)+k]$ is a $k_{th}$ sample in the $j_{th}$ elementary unit of the filtered signal; and $R_{j,k}=r[M(j-1)+k]$ is a $k_{th}$ sample in the $j_{th}$ elementary unit of the ideal signal.

13. The method of claim 11 further comprising calculating a second overall modulation accuracy.

14. The method of claim 13 wherein the calculating a second modulation accuracy comprises calculating in accordance with the following equation:

$$\rho_{overall\_2} = \frac{N \cdot \sum_{j=1}^{N} \left| \sum_{k=\frac{M}{2}+1}^{M+\frac{M}{2}+1} Z_{j,k} R_{j,k}^* \right|^2}{\left\{ \sum_{j=1}^{N} \sum_{k=\frac{M}{2}+1}^{M+\frac{M}{2}+1} |R_{j,k}|^2 \right\} \cdot \left\{ \sum_{j=1}^{N} \sum_{k=\frac{M}{2}+1}^{M+\frac{M}{2}+1} |Z_{j,k}|^2 \right\}}$$

where:

$\rho_{overall\_2}$ is the second modulation accuracy;

j is an index designating an elementary unit of signals;

N is a summation limit designating a number of elementary units;

k is an index designating a sample in the elementary unit;

M is a summation limit designating a number of samples in the elementary unit;

$$Z_{j,k} = z\left[\left(M+\frac{M}{2}+1\right)\cdot(j-1)+k\right]$$

is a $k_{th}$ sample in the $j_{th}$ elementary unit of the filtered signal; and $$R_{j,k} = r\left[\left(M+\frac{M}{2}+1\right)\cdot(j-1)+k\right]$$

is a $k_{th}$ sample in the $j_{th}$ elementary unit of the ideal signal.

15. The method of claim 4 wherein the determining the waveform quality comprises calculating a modulation accuracy for a time division channel.

16. The method of claim 15 wherein the calculating a modulation accuracy for a time division channel comprises calculating in accordance with the following equation:

$$\rho_{\text{TDM\_channel}} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}}$$

where:

$\rho_{TDM\_channel}$ is the modulation accuracy for the time division channel TDM_channel;

j is an index designating an elementary unit of signals;

N is a summation limit designating a number of elementary units;

k is an index designating a sample in the elementary unit;

M is a summation limit designating a number of samples in the elementary unit;

$Z_{j,k}=z[M(j-1)+k]$ is a $k_{th}$ sample in the $j_{th}$ elementary unit of the filtered signal; and $R_{j,k}=r[M(j-1)+k]$ is a $k_{th}$ sample in the $j_{th}$ elementary unit of the ideal signal.

17. The method of claim 4 wherein the determining the waveform quality measurement comprises calculating code domain power coefficients.

18. The method of claim 17 wherein the calculating code domain power coefficients comprises calculating in accordance with the following equation:

$$\rho_{\text{TDM\_channel},i} = \frac{N \cdot \sum_{j=1}^{N} \left| \sum_{k=1}^{M} Z_{j,k} R'^{*}_{i,j,k} \right|^2}{\left\{ \sum_{j=1}^{N} \sum_{k=1}^{M} |R'_{i,j,k}|^2 \right\} \cdot \left\{ \sum_{j=1}^{N} \sum_{k=1}^{M} |Z_{j,k}|^2 \right\}},$$

$i = w_1, \ldots, w_v$ where:

$\rho_{TDM\_channel, i}$ is the code domain coefficient for a time division channel TDM_channel and a code channel i;

w1 is a first code channel for the time division channel TDM_channel;

wv is a last code channel for time division channel TDM_channel;

j is an index designating an elementary unit of signals;

N is a summation limit designating a number of elementary units;

k is an index designating a sample in the elementary unit;

M is a summation limit designating a number of samples in the elementary unit;

$Z_{j,k}=z[M(j-1)+k]$ is a kth sample in the jth elementary unit of the filtered signal; and $R'_{i,j,k}=R'_i[M(j-1)+k]$ is a kth sample in the jth elementary unit of the i-th code channel of the ideal signal.

19. An apparatus for determining a waveform quality measurement, comprising:

a first means configured to provide a plurality of offsets of parameters of an actual signal with respect to an ideal signal;

a second means configured to compensate the actual signal with the plurality of offsets to generate a compensated actual signal;

a third means configured to filter the compensated actual signal to generate a filtered signal;

a fourth means configured to modify the ideal signal to correspond to the filtered signal to generate a midified signal; and a fifth means configured to determine the waveform quality measurement in accordance with the modified ideal signal and the filtered signal.

20. The apparatus of claim 19 wherein the first means, the second means, the third means, the fourth means, and the fifth means comprise a test equipment.

21. The apparatus of claim 19 wherein the first means provide a plurality of offsets by being configured to provide a frequency offset, a time offset, and a phase offset.

22. The apparatus of claim 19 wherein the second means compensate the actual signal with the plurality of offsets by being configured to evaluate the following equation:

$$y(t) = x(t-\hat{\tau}_0) e^{j[\Delta\hat{\omega}t+\hat{\theta}_0]}$$

where:

y(t) is the compensated actual signal;

x(t) is the actual signal;

t is time;

j is an imaginary unit;

$\Delta\hat{\omega}$ is the frequency offset;

$\hat{\tau}_0$ is the time offset; and $\hat{\theta}_0$ is the phase offset.

23. The apparatus of claim 19 wherein the third means filter by being configured to assign the compensated actual signala value that is zero in intervals to be filtered and non-zero elsewhere.

24. The apparatus of claim 23 wherein the third means filter by being configured to assign the compensated actual signala value that is non-zero over a elementary unit of the actual signal.

25. The apparatus of claim 23 wherein third means assign the compensated actual signal a value by being configured to:

define a function with a value that is zero in intervals to be filtered and non-zero elsewhere; and multiply the compensated actual signal by the function.

26. The apparatus of claim 25 wherein the third means define a function by being configured to define a function with a value that is non-zero over a elementary unit of the actual signal.

27. The apparatus of claim 19 wherein the fourth means modify the ideal signal by being configured to generate the modified ideal signal to have a value that is zero in intervals where the filtered signal has a value of zero and non-zero elsewhere.

28. The apparatus of claim 19 wherein the fourth means modify the ideal signal by being configured to assign the ideal signal a value that is zero in intervals where the filtered signal has a value of zero and non-zero elsewhere.

29. The apparatus of claim 28 wherein the fourth means assign the ideal signal a value by being configured to:

define a function with a value that is zero in intervals where the filtered signal has a value of zero and non-zero elsewhere; and multiply the compensated actual signal by the function.

30. The apparatus of claim 24 wherein the fifth means determine the waveform quality by being configured to calculate a first overall modulation accuracy.

31. The apparatus of claim 30 wherein the fifth means calculate a first modulation accuracy by being configured to evaluate the following equation:

$$\rho_{overall-1} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}}$$

where:

$\rho_{overall-1}$ is the first overall modulation accuracy;

j is an index designating an elementary unit of signals;

N is a summation limit designating a number of elementary units;

k is an index designating a sample in the elementary unit;

M is a summation limit designating a number of samples in the elementary unit;

$Z_{j,k}$=z[M(j−1)+k] is a $k_{th}$ sample in the $j_{th}$ elementary unit of the filtered signal; and $R_{j,k}$=r[M(j−1)+k] is a $k_{th}$ sample in the $j_{th}$ elementary unit of the ideal signal.

32. The apparatus of claim 30 wherein the fifth means are further configured to calculate a second overall modulation accuracy.

33. The apparatus of claim 32 wherein the fifth means calculate a second modulation accuracy by being configured to evaluate the following equation:

$$\rho_{overall-2} = \frac{N \cdot \sum_{j=1}^{N} \left| \sum_{k=\frac{M}{2}+1}^{M+\frac{M}{2}+1} Z_{j,k} R_{j,k}^* \right|^2}{\left\{ \sum_{j=1}^{N} \sum_{k=\frac{M}{2}+1}^{M+\frac{M}{2}+1} |R_{j,k}|^2 \right\} \cdot \left\{ \sum_{j=1}^{N} \sum_{k=\frac{M}{2}+1}^{M+\frac{M}{2}+1} |Z_{j,k}|^2 \right\}}$$

where:

$\rho_{overall-2}$ is the second modulation accuracy;

j is an index designating an elementary unit of signals;

N is a summation limit designating a number of elementary units;

k is an index designating a sample in the elementary unit;

M is a summation limit designating a number of samples in the elementary unit;

$$Z_{j,k} = z\left[\left(M + \frac{M}{2} + 1\right) \cdot (j-1) + k\right]$$

is a $k_{th}$ sample in the $j_{th}$ elementary unit of the filtered signal; and $$R_{j,k} = r\left[\left(M + \frac{M}{2} + 1\right) \cdot (j-1) + k\right]$$

is a $k_{th}$ sample in the $j_{th}$ elementary unit of the ideal signal.

34. The apparatus of claim 23 wherein the fifth means determine the waveform quality by being configured to calculate a modulation accuracy for a time division channel.

35. The apparatus of claim 34 wherein the fifth means calculate a modulation accuracy for a time division channel by being configured to evaluate the following equation:

$$\rho_{TDM\_channel} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}}$$

where:

$\rho_{TDM\_channel}$ is the modulation accuracy for the time division channel TDM_channel;

j is an index designating an elementary unit of signals;

N is a summation limit designating a number of elementary units;

k is an index designating a sample in the elementary unit;

M is a summation limit designating a number of samples in the elementary unit;

$Z_{j,k}$=z[M(j−1)+k] is a $k_{th}$ sample in the $j_{th}$ elementary unit of the filtered signal; and $R_{j,k}$=r[M(j−1)+k] is a $k_{th}$ sample in the $j_{th}$ elementary unit of the ideal signal.

36. The apparatus of claim 23 wherein the fifth means determine the waveform quality measurement by being configured to calculate code domain power coefficients.

37. The apparatus of claim 36 wherein the fifth means calculate code domain power coefficients by being configured to evaluate the following equation:

$$\rho_{TDM\_channel,i} = \frac{N \cdot \sum_{j=1}^{N} \left| \sum_{k=1}^{M} Z_{j,k} R'^{*}_{i,j,k} \right|^2}{\left\{ \sum_{j=1}^{N} \sum_{k=1}^{M} |R'_{i,j,k}|^2 \right\} \cdot \left\{ \sum_{j=1}^{N} \sum_{k=1}^{M} |Z_{j,k}|^2 \right\}},$$

$$i = w_1, \ldots, w_v$$

where:

$\rho_{TDM\_channel,\,i}$ is the code domain coefficient for a time division channel TDM_channel and a code channel i;

w1 is a first code channel for the time division channel TDM_channel;

wv is a last code channel for time division channel TDM_channel;

j is an index designating an elementary unit of signals;

N is a summation limit designating a number of elementary units;

k is an index designating a sample in the elementary unit;

M is a summation limit designating a number of samples in the elementary unit;

$Z_{j,k}=z[M(j-1)+k]$ is a kth sample in the jth elementary unit of the filtered signal; and $R'_{i,j,k}=R'_i[M(j-1)+k]$ is a kth sample in the jth elementary unit of the i-th code channel of the ideal signal.

38. An apparatus for determining a waveform quality measurement, comprising:

a processor; and a storage medium coupled to the processor and containing a set of instructions executable by the processor to:

provide a plurality of offsets of parameters of an actual signal with respect to an ideal signal;

compensate the actual signal with the plurality of offsets to generate a compensated actual signal;

filter the compensated actual signal to generate a filtered signal;

modify the ideal signal to correspond to the filtered signal to generate a midified signal; and determine the waveform quality measurement in accordance with the modified ideal signal and the filtered signal.

39. The apparatus of claim 38 wherein the processor provides a plurality of offsets by executing the instructions to provide a frequency offset, a time offset, and a phase offset.

40. The apparatus of claim 38 wherein the processor compensates the actual signal with the plurality of offsets by executing the instructions to:

$$y(t)=x(t-\hat{\tau}_0)e^{j[\Delta\hat{\omega}t+\hat{\theta}_0]}$$

where:

y(t) is the compensated actual signal;

x(t) is the actual signal;

t is time;

j is an imaginary unit;

$\Delta\hat{\omega}$ is the frequency offset;

$\hat{\tau}_0$ is the time offset; and $\hat{\theta}_0$ is the phase offset.

41. The apparatus of claim 38 wherein the processor filters by executing the instructions to assign the compensated actual signal a value that is zero in intervals to be filtered and non-zero elsewhere.

42. The apparatus of claim 41 wherein the processor filters by executing the instructions to assign the compensated actual signal a value that is non-zero over a elementary unit of the actual signal.

43. The apparatus of claim 41 wherein processor assigns the compensated actual signal a value by executing the instructions to:

define a function with a value that is zero in intervals to be filtered and non-zero elsewhere; and multiply the compensated actual signal by the function.

44. The apparatus of claim 43 wherein the processor defines a function by executing the instructions to define a function with a value that is non-zero over a elementary unit of the actual signal.

45. The apparatus of claim 38 wherein the processor modifies the ideal signal by executing the instructions to generate the modified ideal signal to have a value that is zero in intervals where the filtered signal has a value of zero and non-zero elsewhere.

46. The apparatus of claim 38 wherein the processor modifies the ideal signal by executing the instructions to assign the ideal signal a value that is zero in intervals where the filtered signal has a value of zero and non-zero elsewhere.

47. The apparatus of claim 46 wherein the processor assigns the ideal signal a value by executing the instructions to:

define a function with a value that is zero in intervals where the filtered signal has a value of zero and non-zero elsewhere; and multiply the compensated actual signal by the function.

48. The apparatus of claim 42 wherein the processor determines the waveform quality by executing the instructions to calculate a first overall modulation accuracy.

49. The apparatus of claim 48 wherein the processor calculates a first modulation accuracy by executing the instructions to evaluate the following equation:

$$\rho_{overall-1} = \frac{N \cdot \sum_{j=1}^{N} \left| \sum_{k=1}^{M} Z_{j,k} R^{*}_{j,k} \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}}$$

where:

$\rho_{overall-1}$ is the first overall modulation accuracy;

j is an index designating an elementary unit of signals;

N is a summation limit designating a number of elementary units;

k is an index designating a sample in the elementary unit;

M is a summation limit designating a number of samples in the elementary unit;

$Z_{j,k}=z[M(j-1)+k]$ is a $k_{th}$ sample in the $j_{th}$ elementary unit of the filtered signal; and $R_{j,k}[M(j-1)+k]$ is a $k_{th}$ sample in the $j_{th}$ elementary unit of the ideal signal.

50. The apparatus of claim 48 wherein the processor is further configured to execute the instructions to calculate a second overall modulation accuracy.

51. The apparatus of claim 50 wherein the processor calculates a second modulation accuracy by executing the instructions to evaluate the following equation:

$$\rho_{overall-2} = \frac{N \cdot \sum_{j=1}^{N} \left| \sum_{k=\frac{M}{2}+1}^{M+\frac{M}{2}+1} Z_{j,k} R_{j,k}^* \right|^2}{\left\{ \sum_{j=1}^{N} \sum_{k=\frac{M}{2}+1}^{M+\frac{M}{2}+1} |R_{j,k}|^2 \right\} \cdot \left\{ \sum_{j=1}^{N} \sum_{k=\frac{M}{2}+1}^{M+\frac{M}{2}+1} |Z_{j,k}|^2 \right\}}$$

where:

$\rho_{overall-2}$ is the second modulation accuracy;
j is an index designating an elementary unit of signals;
N is a summation limit designating a number of elementary units;
k is an index designating a sample in the elementary unit;
M is a summation limit designating a number of samples in the elementary unit;

$$Z_{j,k} = z\left[\left(M + \frac{M}{2} + 1\right) \cdot (j-1) + k\right]$$

is a $k_{th}$ sample in the $j_{th}$ elementary unit of the filtered signal; and $$R_{j,k} = r\left[\left(M + \frac{M}{2} + 1\right) \cdot (j-1) + k\right]$$

is a $k_{th}$ sample in the $j_{th}$ elementary unit of the ideal signal.

52. The apparatus of claim 41 wherein the processor determines the waveform quality by executing the instructions to calculate a modulation accuracy for a time division channel.

53. The apparatus of claim 52 wherein the processor calculates a modulation accuracy for a time division channel by executing the instructions to evaluate the following equation:

$$\rho_{TDM\_channel} = \frac{N \cdot \sum_{j=1}^{N} \left| \sum_{k=1}^{M} Z_{j,k} R_{j,k}^* \right|^2}{\left\{ \sum_{j=1}^{N} \sum_{k=1}^{M} |R_{j,k}|^2 \right\} \cdot \left\{ \sum_{j=1}^{N} \sum_{k=1}^{M} |Z_{j,k}|^2 \right\}}$$

where:

$\rho_{TDM\_channel}$ is the modulation accuracy for the time division channel TDM_channel;
j is an index designating an elementary unit of signals;
N is a summation limit designating a number of elementary units;
k is an index designating a sample in the elementary unit;
M is a summation limit designating a number of samples in the elementary unit;

$Z_{j,k} = z[M(j-1)+k]$ is a $k_{th}$ sample in the $j_{th}$ elementary unit of the filtered signal; and $R_{j,k} = r[M(j-1)+k]$ is a $k_{th}$ sample in the $j_{th}$ elementary unit of the ideal signal.

54. The apparatus of claim 41 wherein the processor determines the waveform quality measurement by executing the instructions to calculate code domain power coefficients.

55. The apparatus of claim 54 wherein the processor calculates code domain power coefficients by executing the instructions to evaluate:

$$\rho_{TDM\_channel,i} = \frac{N \cdot \sum_{j=1}^{N} \left| \sum_{k=1}^{M} Z_{j,k} R'^{*}_{j,k} \right|^2}{\left\{ \sum_{j=1}^{N} \sum_{k=1}^{M} |R'_{i,j,k}|^2 \right\} \cdot \left\{ \sum_{j=1}^{N} \sum_{k=1}^{M} |Z_{j,k}|^2 \right\}},$$

$i = w_1, \ldots, w_v$ where:

$\rho_{TDM\_channel,\ i}$ is the code domain coefficient for a time division channel TDM_channel and a code channel i;
w1 is a first code channel for the time division channel TDM_channel;
wv is a last code channel for time division channel TDM_channel;
j is an index designating an elementary unit of signals;
N is a summation limit designating a number of elementary units;
k is an index designating a sample in the elementary unit;
M is a summation limit designating a number of samples in the elementary unit;

$Z_{j,k}=z[M(j-1)+k]$ is a kth sample in the jth elementary unit of the filtered signal; and $R'_{i,j,k}=R'_i[M(j-1)+k]$ is a kth sample in the jth elementary unit of the i-th code channel of the ideal signal.

* * * * *